United States Patent [19]

Ross

[11] 3,902,251

[45] Sept. 2, 1975

[54] ADJUSTABLE RETICLE FOR TELESCOPIC RIFLE SIGHTS

[75] Inventor: Cecil J. Ross, El Paso, Tex.

[73] Assignee: W. R. Weaver Company, New Haven, Conn.

[22] Filed: July 17, 1974

[21] Appl. No.: 489,195

[52] U.S. Cl. .................. 33/246; 33/298; 356/247
[51] Int. Cl.² .................... F41G 1/38; G01C 9/02
[58] Field of Search ...... 356/247, 151, 152; 350/10; 33/246, 298

[56] References Cited
UNITED STATES PATENTS

| | | | |
|---|---|---|---|
| 2,452,592 | 11/1948 | Meyer | 33/298 |
| 2,949,816 | 8/1960 | Weaver | 356/247 |
| 3,213,539 | 10/1965 | Burris | 350/10 |
| 3,484,148 | 12/1969 | Gotoh | 356/247 |

*Primary Examiner*—Vincent P. McGraw
*Assistant Examiner*—Jon W. Henry
*Attorney, Agent, or Firm*—Donald R. Motsko; William W. Jones

[57] ABSTRACT

A reticle for a telescopic sight which reticle is laterally adjustable with respect to the optical axis of the scope so as to permit alignment of aiming point of the reticle with the optical axis of the scope.

3 Claims, 5 Drawing Figures

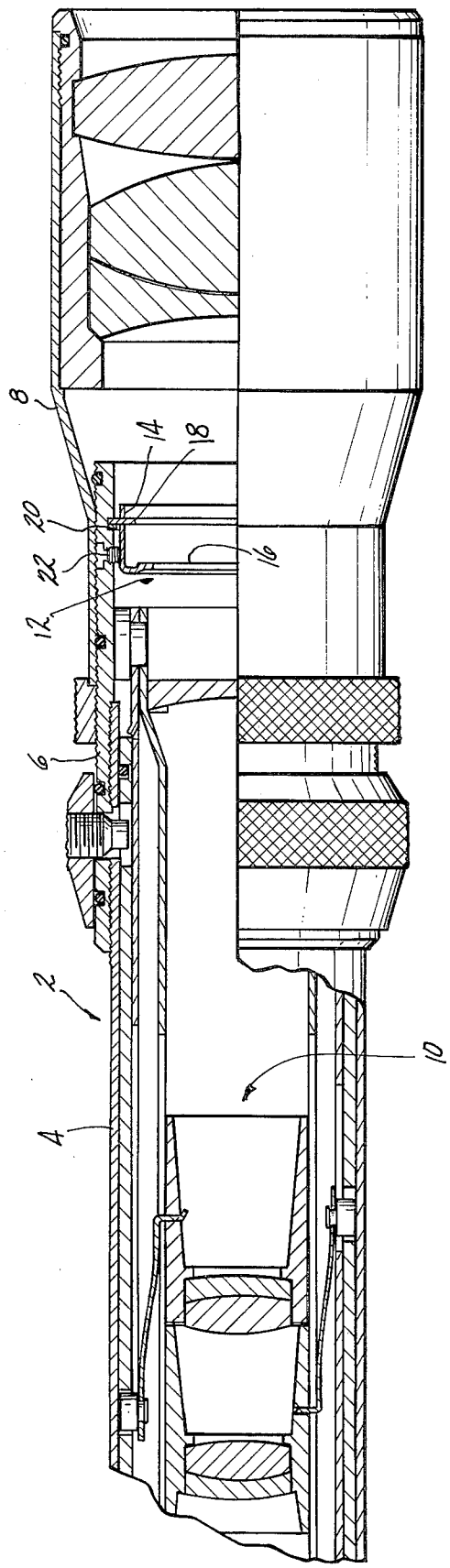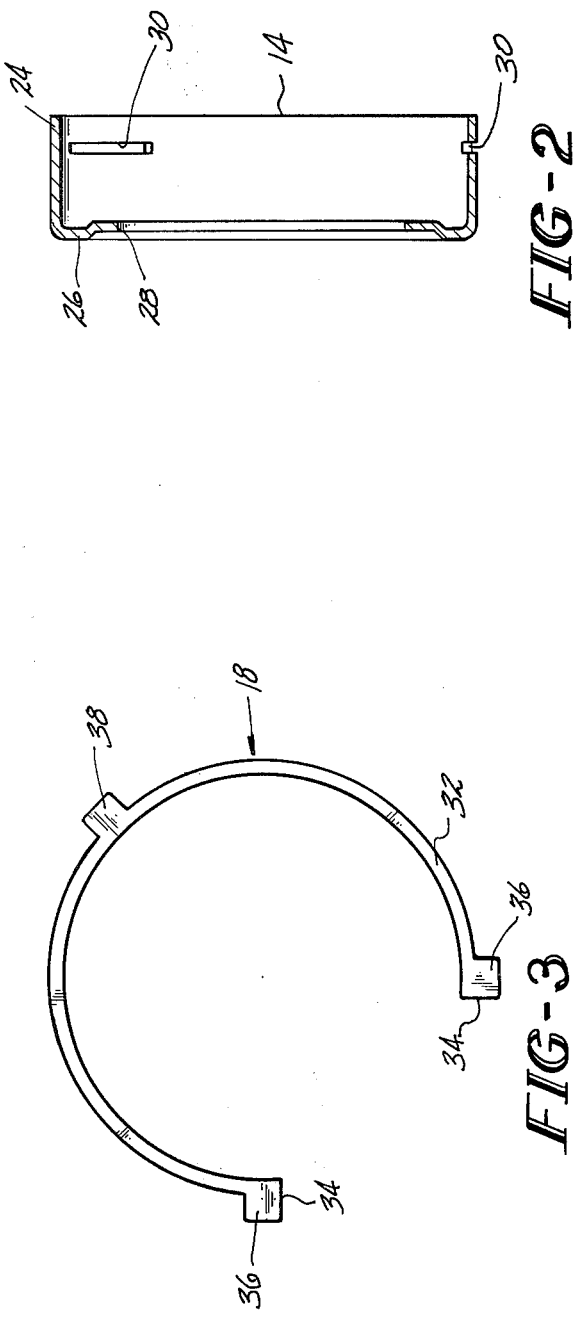

ADJUSTABLE RETICLE FOR TELESCOPIC RIFLE SIGHTS

This invention relates to a reticle for use with a telescopic sight, and more particularly, to a reticle which is mounted for lateral movement with respect to the optical axis of the scope so as to permit alignment of the reticle aiming point and the optical axis of the scope.

In order for a telescopic sight, or scope, to function properly, it is of course necessary that the aiming point of the reticle be as closely aligned with the optical axis of the scope as possible. This alignment can be pre-set during factory assembly of the scope, however, with mass production techniques, it should be an operation which can be quickly and easily accomplished.

In the case of variable power scopes, as contrasted with fixed power scopes, the most commonly used method of changing the power of the scope involves mechanically changing the positions of the erector lenses within the scope longitudinally of the optical axis of the scope. This longitudinal movement of the scope erector lenses may result in a slight lateral shifting of the optical axis of the scope due to off-center lenses, imperfect mechanical components and the like. Thus in the case of a variable scope, the reticle aiming point should preferably be laterally adjusted at the factory to lie along the average position of the optical axis for the various powers of the scope.

The above-noted conditions are well known to the prior art and a number of structures have been devised for optically centering the aiming point of the reticle. Typical of the prior art constructions is the arrangement shown in U.S. Pat. No. 3,213,539 to Burris. A problem existing with the construction shown in U.S. Pat. No. 3,213,539 stems from the fact that the reticle cell or holder is pivoted within the scope about a point which is longitudinally offset from the reticle aiming point, thus the reticle will be moved into planes which are not normal to the optical axis of the scope. This results in cross hair or reticle distortion as viewed through the scope lenses. The prior art constructions are also bulky and rather difficult to assemble.

The reticle cell construction of this invention is designed to permit lateral movement of the reticle to align its aiming point with the optical axis of the scope. The reticle cell is spring biased by a unique spring which fits inside of the cell and enables the cell to be shifted laterally in the same plane so that the reticle does not pivot about a point longitudinally offset from itself. The reticle spring also serves the additional function of providing a retaining stop which resists firearm recoil and holds the reticle against longitudinal displacement from the focal plane of the scope in which it is positioned. Furthermore, the reticle construction of this invention is quite compact, easy to assemble and cannot be tampered with by the user once adjusted in the factory.

It is, therefore, an object of this invention to provide a reticle construction for a telescopic gun sight which permits lateral adjustment of the reticle to align its aiming point with the optical axis of the scope.

It is another object of this invention to provide a reticle construction of the character described wherein lateral movement of the reticle for alignment thereof occurs in substantially a single plane.

It is yet another object of this invention to provide a reticle construction of the character described which is compact and easily assembled.

It is a further object of this invention to provide a reticle construction of the character described which includes an internal laterally biasing spring member which also provides a restraint against longitudinal displacement of the reticle by firearm recoil forces.

These and other objects and advantages of this invention will become more readily apparent to those skilled in the art from the following detailed description of an embodiment of the invention, taken in conjunction with the accompanying drawings, in which:

FIG. 1 is a vertical sectional view of a portion of a variable power telescopic rifle sight employing a reticle construction formed in accordance with this invention;

FIG. 2 is a vertical sectional view of the reticle holder or cup component of the reticle construction of this invention;

FIG. 3 is a plan view of the reticle cup spring of this invention;

Figure 5:
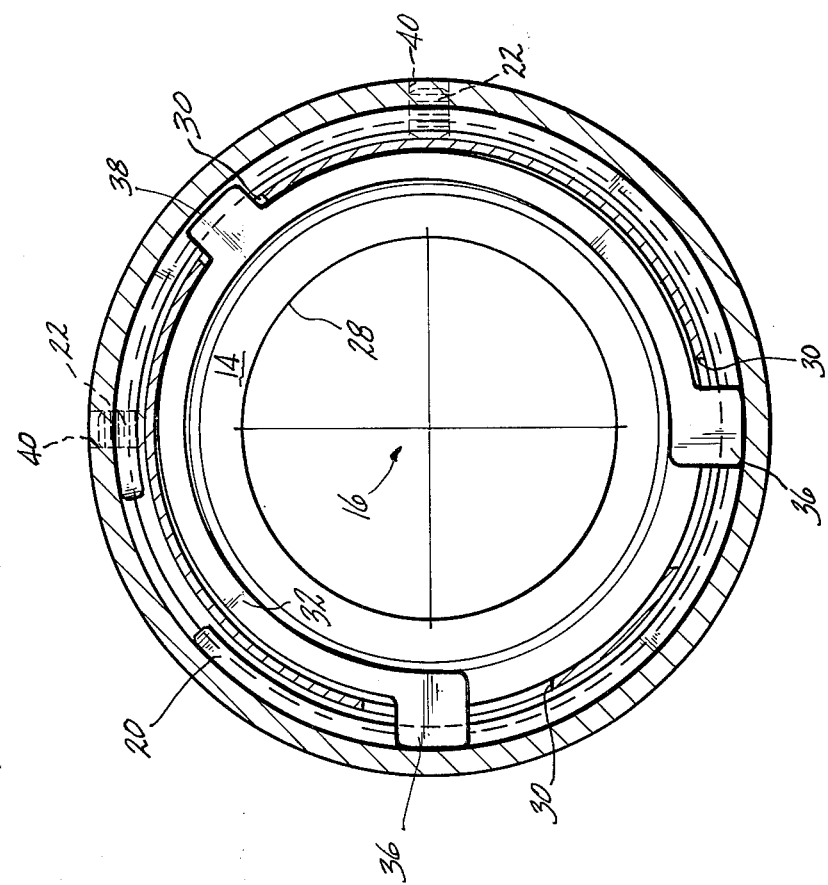
FIG. 5 is a vertical sectional view of the invention taken along line 5—5 of FIG. 4.

Referring now to the drawings, in FIG. 1 there is shown a relatively conventional variable power telescopic gun sight, or scope 2 having a main scope barrel 4, a tubular barrel extension 6, and an ocular housing 8. An internal image erecting system denoted generally by the numeral 10 is disposed within the main scope barrel 4 and is adjustable for power adjustment in a conventional manner. Details of the erector system and power adjustment do not form a part of this invention and will not be further described herein.

The reticle assembly denoted generally by the numeral 12 is mounted within the tubular barrel extension 6 at the rear image plane of the scope. The reticle assembly 12 includes a reticle cup 14, cross hairs 16, a reticle cup spring 18, a retaining ring 20, and adjustment screws 22.

Referring now to FIG. 2, details of the reticle cup 14 are shown. The reticle cup 14 includes an annular side wall 24 and a bottom wall 26, the latter of which is provided with an opening 28 which serves to diaphragm the image viewed through the scope. The cup side wall 24 is provided with a plurality of slots 30, which are preferably three in number and which are angularly spaced apart from each other about the axis of the cup 14.

Referring to FIG. 3, the reticle cup spring 18 is formed from a flat piece of spring steel, and includes a curvilinear body portion 32 having spaced apart end surfaces 34 so that the spring may be compressed by moving the surfaces 34 toward each other. A pair of radially outwardly extending end tabs 36 are formed on the body 32, as is a radially outwardly extending intermediate tab 38. The end tabs 36 are longer than the tab 38 so as to push the reticle cup off center toward the shorter tab 38.

Figure 4:
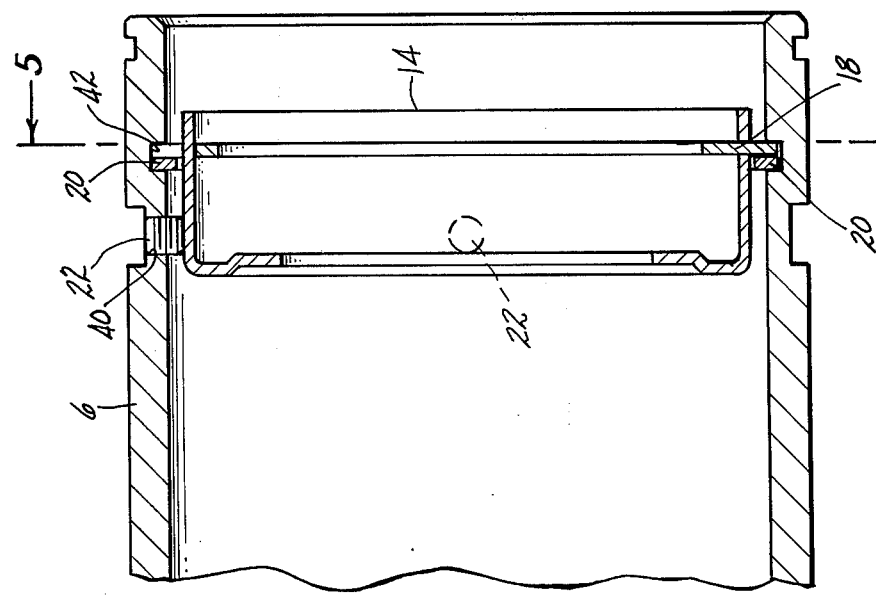
FIG. 4 is an enlarged vertical sectional view of the reticle construction of this invention.

Details of the reticle assembly are most clearly shown in FIGS. 4 and 5. The tubular barrel extension 6 is formed with a pair of threaded holes 40 which are angularly offset from each other by 90° and which receive the reticle adjustment screws 22. The extension 6 is also provided with an internal groove 42 in which the retaining ring 20 is seated. The reticle cup spring 18 is compressed and positioned inside of the reticle cup 14 so that the spring tabs 36 and 38 project radially outwardly of the cup 14 through the cup side wall slots 30.

The spring tabs 36 and 38 project into the extension groove 42 so as to, on one side engage on the wall of the groove 42 and on the other side engage the retaining ring 20. Thus the spring 18, by means of its tabs 36 and 38, serves to hold the reticle cup 14 against longitudinal movement which would be induced by handling and by firearm recoil. It will be noted that the spring tabs 36 are positioned directly opposite the adjustment screws 22 and engage the bottom wall of the extension groove 42 as seen in FIG. 5. Thus the tabs 36 serve to bias the cup 14 against the adjusting screws 22 in such a manner that the cup 14 will be moved vertically and horizontally by inward or outward movement of the screws 22 thus permitting lateral adjustment of the cup 14 to properly align the aiming point of the reticle 16 with the optical axis, or average optical axis of the scope.

By mounting the reticle cup spring inside of the reticle cup, the body of the spring pushes the reticle cup sideways from the inside of the cup and against the adjustment screws. Thus movement of the adjustment screws results in lateral sliding of the cup, rather than pivoting as with the prior art constructions.

Alignment of the reticle aiming point with the optical axis of the scope during factory assembly is accomplished as follows. The finished scope is clamped into a fixture and focussed on a distant target. The eyepiece is then removed so as to uncover the reticle adjustment screws. An eyepiece is built into the test fixture for use in lieu of the scope eyepiece. The target is viewed through the scope and test fixture eyepiece, and with a fixed power scope, the aiming point of the reticle is brought into alignment with the optical axis of the scope by manipulation of the reticle adjustment screws. With a variable power scope, the operator changes the scope power while viewing the target to determine the position of the optical axis. He then adjusts the reticle screws to align the aiming point of the reticle with the average position of the optical axis of the scope. The scope is then removed from the fixture and the eyepiece is mounted on the scope.

It will be understood that, while the reticle shown in the disclosed embodiment is in the form of cross hairs, any type of reticle which can be mounted on the cup can be used.

Since many changes and variations of the disclosed embodiment of the invention may be made without departing from the inventive concept, it is not intended to limit the invention otherwise than as required by the appended claims.

What is claimed is:

1. An optical gun sight comprising a hollow tubular member; a cup-shaped member mounted in said tubular member; said cup-shaped member having a side wall provided with a plurality of circumferentially spaced slots; reticle means mounted in said cup-shaped member to provide an aiming point for said sight; adjustment means mounted on said tubular member and engaging said cup-shaped member for moving said cup-shaped member laterally of a longitudinal axis of said tubular member; and spring means mounted within said cup-shaped member and including means projecting through said slots in the side wall of said cup-shaped member to engage a side wall of said tubular means, said spring means being operative to bias said cup-shaped member against said adjustment means whereby the aiming point of said reticle means is moved laterally in substantially a single plane in response to adjusting movement of said adjustment means.

2. The gun sight of claim 1, wherein said means projecting through said slots is a plurality of tabs formed on said spring means.

3. The gun sight of claim 2, wherein said tubular member has a groove formed internally thereof, and said tabs project into said groove to engage side walls thereof to provide resistance against axial displacement of said cup-shaped member.

* * * * *